United States Patent [19]
Piech et al.

[11] Patent Number: 5,442,744
[45] Date of Patent: Aug. 15, 1995

[54] METHODS AND APPARATUS FOR DISPLAYING AND EDITING MULTIMEDIA INFORMATION

[75] Inventors: Michael Piech, Palo Alto; Trevor Morris, Mountain View, both of Calif.

[73] Assignee: Sun Microsystems, Inc., Mountain View, Calif.

[21] Appl. No.: 865,043

[22] Filed: Apr. 3, 1992

[51] Int. Cl.⁶ .................................................. G06F 3/00
[52] U.S. Cl. ...................................... 395/154; 395/155; 395/159
[58] Field of Search ................. 395/154, 155, 159; 358/311, 335; 360/13, 14.1, 14.2, 14.3

[56] References Cited

U.S. PATENT DOCUMENTS

| | | | |
|---|---|---|---|
| Re. 32,632 | 12/1985 | Atkinson | 340/709 |
| 4,555,775 | 10/1982 | Pike | 364/900 |
| 4,746,994 | 8/1985 | Ettlinger | 360/13 |
| 4,889,136 | 4/1986 | Beard et al. | 340/706 |
| 4,931,783 | 7/1988 | Atkinson | 340/710 |
| 5,040,131 | 11/1989 | Torres | 364/521 |
| 5,148,154 | 12/1990 | McKay et al. | 340/712 |
| 5,278,943 | 1/1994 | Gasper et al. | 395/2 |
| 5,283,819 | 2/1994 | Glick et al. | 379/90 |

OTHER PUBLICATIONS

Cats Meow Brochure, Tiger Media, 3 pages, 1991.
Avid/1 Media Composer Brochure, Avid Technologies, 2 pages, before 1992.
Pinnacle Brochure, Pinnacle Systems, Inc., 4 pages, before 1992.
Seehorn Brochure, Seehorn Technologies, Inc., 8 pages, before 1992.
Emc² Brochure, Editing Machines Corporation, 4 pages, before 1992.

*Primary Examiner*—Heather R. Herndon
*Assistant Examiner*—Michael Smith
*Attorney, Agent, or Firm*—Blakely Sokoloff Taylor & Zafman

[57] ABSTRACT

A multimedia display and editing system for editing multimedia projects on a display screen. A computer display screen is presented to the user which provides three different views of multimedia information. The first view is the Player which resembles a virtual video recorder with a display monitor. The second view is a story board which is very similar to a traditional story board. The third view is the Strip Viewer which presents the user with a time-line based view of the multimedia information. On the Strip Viewer display is an innovative screen tool referred to as a "Splinder", which is used for editing the beginning and ending points of displayed multimedia tracks. The Splinder splits two segments of multimedia information. The Splinder can be used to edit the ends of the two multimedia information segments.

19 Claims, 6 Drawing Sheets

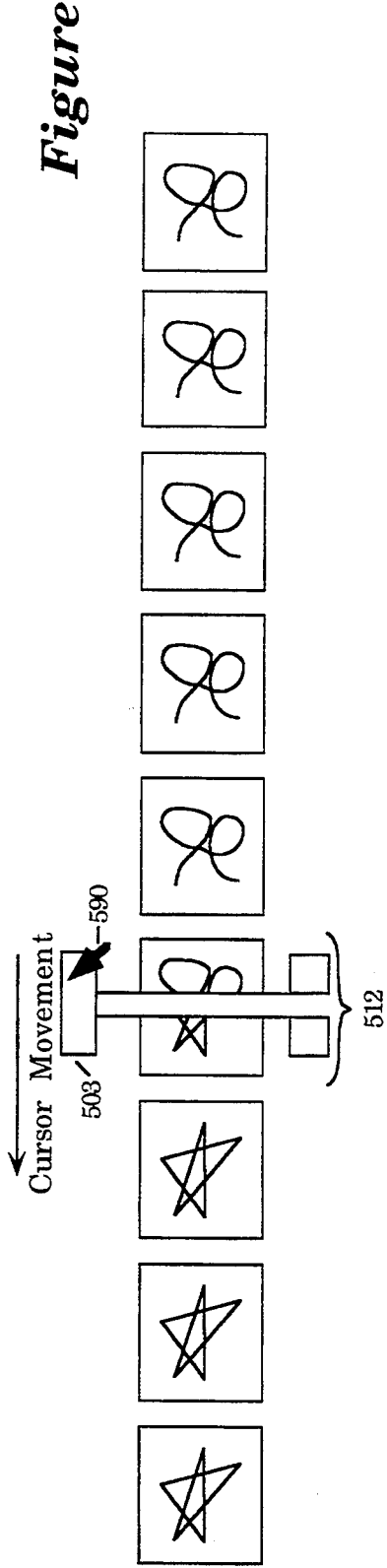
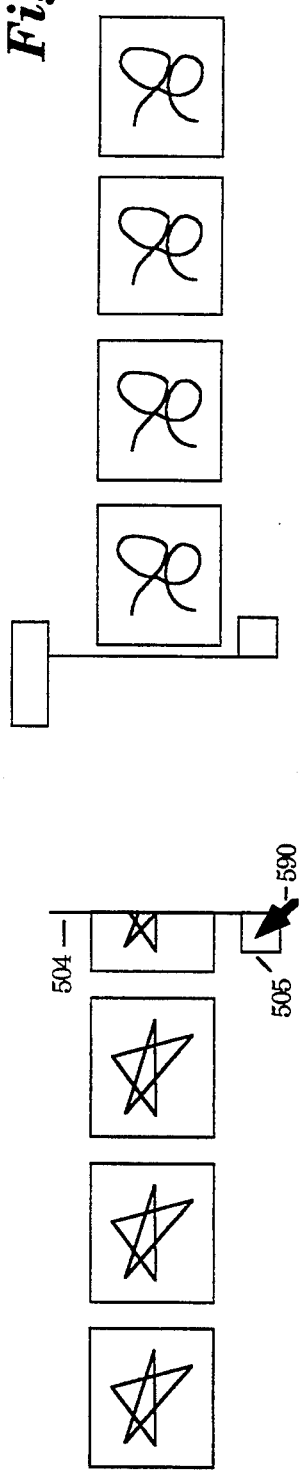
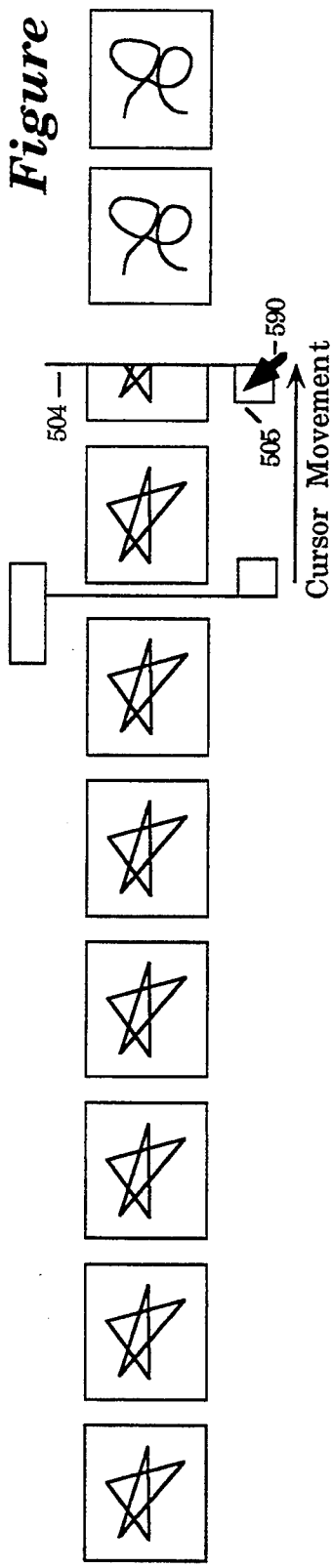

METHODS AND APPARATUS FOR DISPLAYING AND EDITING MULTIMEDIA INFORMATION

BACKGROUND OF THE INVENTION

1. Field of the Invention

This invention relates to the field of multimedia display and editing devices. More particularly, to a method and apparatus for displaying multimedia information upon a display screen and providing an intuitive way for a user to edit the multimedia information presented upon the display screen.

2. Art Background

Multimedia is combination of a number of different media types into a single work. For example, a multimedia work may comprise the combination of video information, audio information graphic overlays, and animation. Since computers are well-suited for combining such varied media types, they are increasingly being used to develop and display multimedia works.

The creation of a multimedia production is relatively similar to the production of a video, therefore techniques from the video arts are often used by the creators of multimedia productions. For example, standard video editing tools such as the story board and the editing video deck are often implemented in multimedia development tools to aid in the creation of multimedia productions.

However, by using a computer, new interactive tools can be created which aid in the creation and editing of a multimedia production. Ideally, these new interactive tools would provide an intuitive user interface which is both easy to learn and easy to use.

SUMMARY OF THE INVENTION

It is therefore the object of the present invention to provide a method and apparatus for displaying multimedia information upon a computer display screen.

It is a further object of the present invention to provide a method and apparatus for allowing a user to edit the multimedia information displayed upon a display screen in an intuitive manner.

It is a further objective of the present invention to present a user an intuitive method for extending and trimming tracks of multimedia information by displaying the multimedia information as strips along with an editing tool used to extend or trim the strip.

These and other objects are accomplished by the unique method and apparatus of the present invention. The method and apparatus of the present invention comprises a system for editing multimedia projects on a display screen. A computer display screen is presented to the user which provides three different views of the multimedia information. The first view is the Player which resembles a virtual video recorder with a monitor. The second view is a Story Board which is very similar to a traditional story board. The third view is the Strip Viewer which presents the user with a time-line based view of the multimedia information. On the Strip Viewer display is a screen tool referred to as a "Splinder". The Splinder is used for editing the beginning and ending points of multimedia tracks.

BRIEF DESCRIPTION OF THE DRAWINGS

The objects, features and advantages of the present invention will be apparent to one skilled in the art from the following detailed description in which:

FIGS. 5(a)-5(c) display a Splinder being used to edit shots of video frame data.

DETAILED DESCRIPTION OF THE INVENTION

A method and apparatus for displaying and editing multimedia information is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Figure 1:
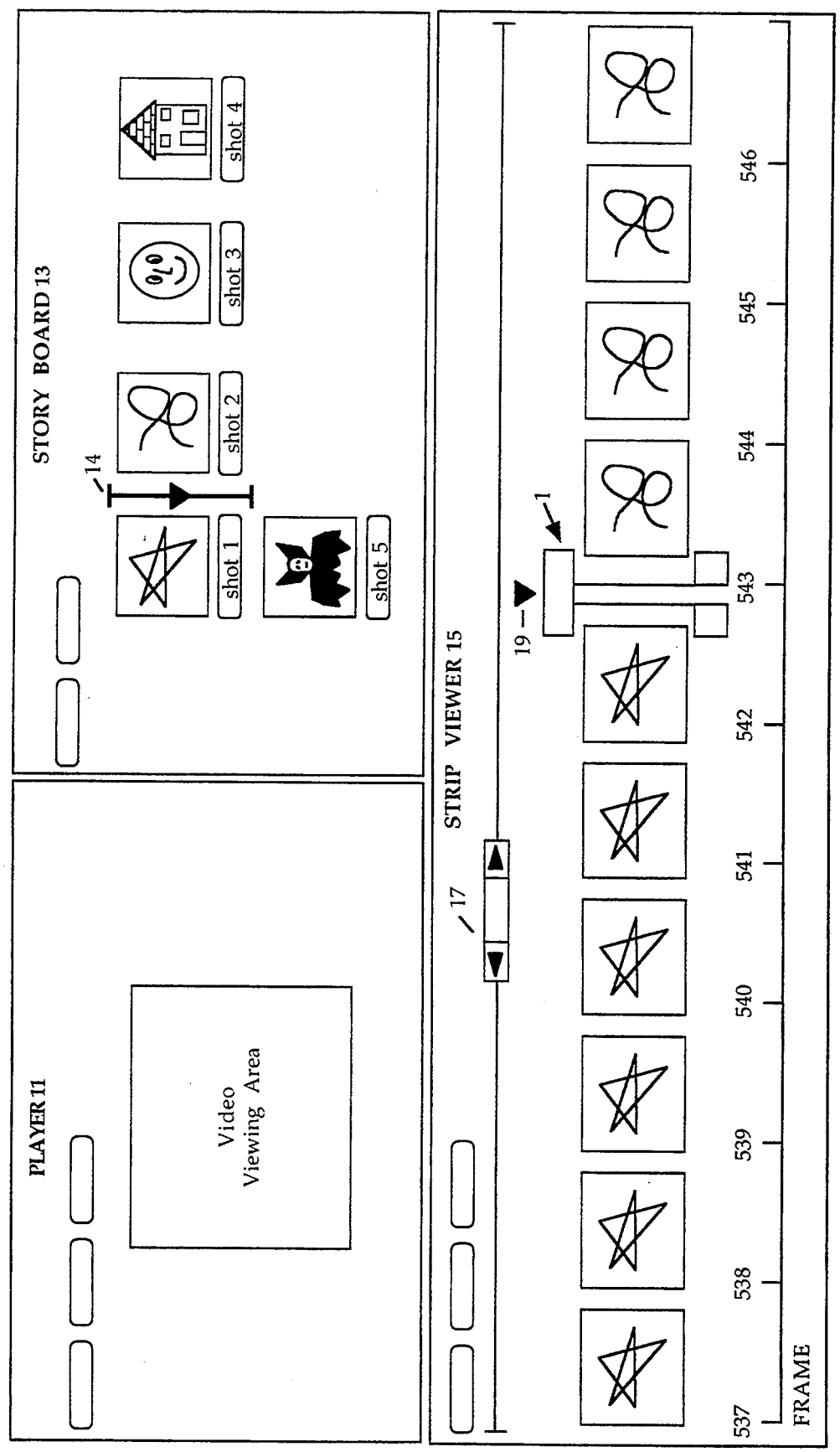
FIG. 1 is a diagram of a multimedia display and editing system, including a Player, a Story Board, and a Strip Viewer Display.

Referring to FIG. 1, a multimedia editor display screen utilizing the teachings of the present invention is displayed. The multimedia editor display screen presents the user with three "views" of multimedia information. The first view of the multimedia information is provided by the Player 11. The Player 11 is designed to simulate the operation of a editing video tape recorder and is therefore used for viewing and recording live video. A user "records" video with the Player 11 by identifying a beginning video frame or "in-point" and an ending video frame or "out-point". A segment of consecutive video frames defined as such is referred to as a "shot" of video. When the video player is not operating, the first frame of the current video selection is displayed in the viewing area.

The second view of the multimedia information is provided by the Story Board 13 of FIG. 1. The Story Board 13 gives the user a "higher level" view of the multimedia information by displaying entire shots of video as a single icon as shown by shot 1 through shot 5. Using the Story Board 13, a user can reorder, delete, and copy entire shots of video by selecting the icon representing the shot with a cursor and then selecting the desired edit operation from a menu.

Figure 2:
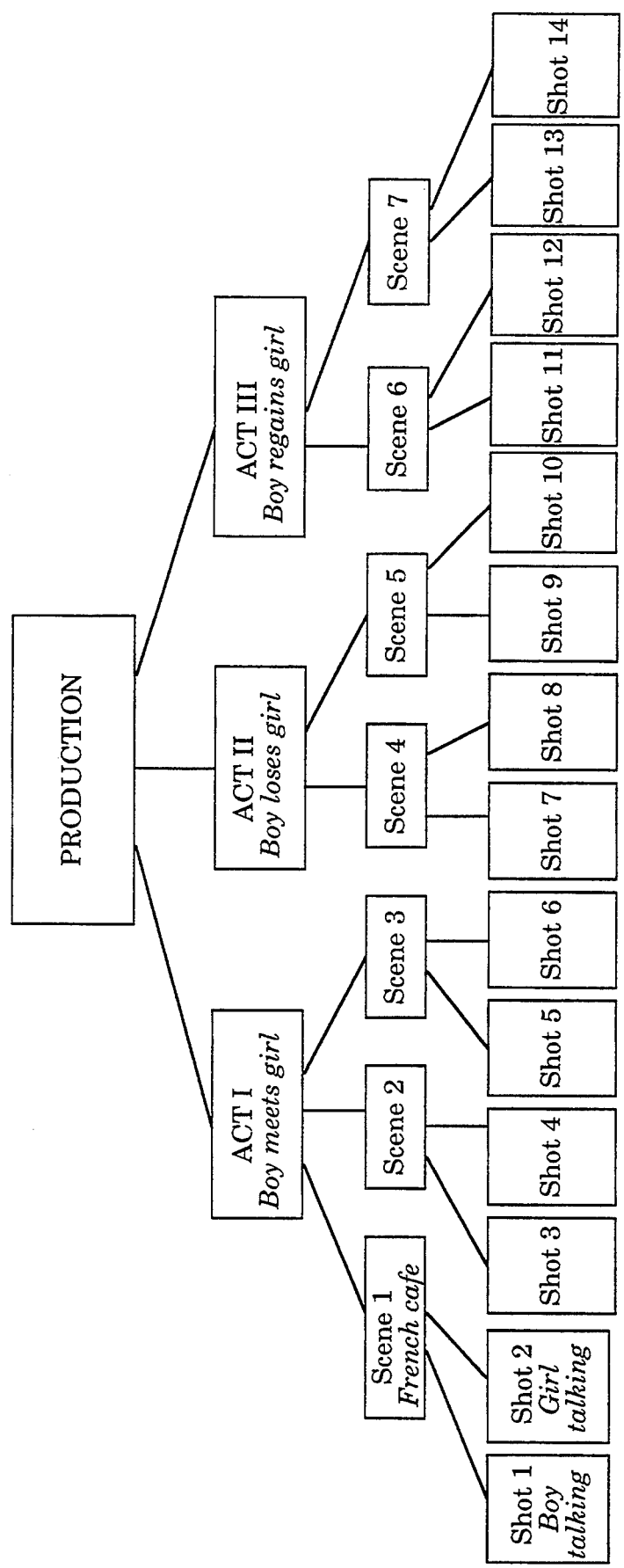
FIG. 2 provides one possible hierarchical structure for a multimedia production.

Alternatively, a user can use the Story Board 13 to edit higher level video structures such as "scenes" or "acts". These terms are borrowed from the theatrical arts and are used to define higher level groupings of video or film. For example, a producer/artist creating a multimedia production may wish to group a collection video shots together into a "scene". For example, a set of shots from different camera angles of a man and a woman talking at a french cafe could be grouped together as the "french cafe" scene. A collection of scenes can then be grouped together into higher level "Acts". Continuing with the previous example, a collection of scenes containing the first few meetings of the man and woman could be grouped together as the "boy meets girl" act. FIG. 2 illustrates one possible hierarchical structure of acts, scenes and shots that a producer might use to organize a multimedia production.

However, the Story Board 13 of FIG. 1 imposes no strict hierarchical structure which a producer must use. Therefore, the Story Board 13 can be used to edit at any hierarchical level the user desires. For example, a producer may use the Story Board 13 at the "shot" level to work out the mechanics of a specific scene. The producer can move up to the "scene" level to get an overall feel for the mood of the multimedia production.

The combination of these first two views, the Player 11 view and the Story Board 13 view, offer the functionality of an editing video tape recorder and an ordinary story board. In this manner, the tools of a traditional video editing studio are provided to the user. Therefore, a user that is familiar with traditional video editing tools will quickly be able to learn and use the multimedia editor described.

The third view of multimedia information presented by the multimedia editor display screen of FIG. 1 is the Strip Viewer 15. This view provides a user with a previously unavailable detailed look at the contents of a media track. The Strip Viewer 15 allows the user to view multimedia information on a time-line basis with an adjustable level of resolution. At the most detailed level (or highest resolution), the Strip Viewer 15 displays the multimedia information in indivisible "atomic" pieces. For example, when a user views video information with the Strip Viewer 15 at its most detailed level (or highest resolution), every individual frame of video is displayed.

For example, the Strip Viewer 15 in FIG. 1 is set at the highest resolution so that each individual video frame is displayed. The display resembles a strip of movie film with each individual frame having its own unique frame number. The time scale or "resolution" scale at which the multimedia information is displayed below the multimedia information. In FIG. 1, the resolution scale lists consecutive frame numbers since it is at the highest resolution. The resolution can be adjusted so that every 5th, 30th, 100th, or other multiple number of frames are displayed. In this manner a user can scroll around using a familiar scroll bar 17 at "low resolution" to find a general area of interest and then zoom in to the finest resolution to examine the area in detail.

The three views of the multimedia information displayed in FIG. 1 can interact and affect each other. For example, if the "caret" 14 which is used to designate the insertion point in the Story Board 13 is moved, the Strip Viewer will update itself to reflect this positioning. This is demonstrated in FIG. 1, wherein the caret 14 in the Story Board 13 has been set between shot one and shot two. This positioning of the caret 14 is reflected down in the Strip Viewer 15 which now displays the border between the frames of shot one and shot two. Between the frames of shot one and the frames of shot two is an innovative tool referred to as a "Splinder" 1. The Splinder 1 is used to mark the boundary between shots and can be used to adjust the boundary as will be subsequently explained. Likewise, adjustments made in the Strip Viewer 15 area will affect the Story Board 13 area. For example, if the caret 19 in the the Strip Viewer 15 is moved, the caret 14 in the Story Board 13 will update to reflect the move of the caret 19 in the strip viewer. The Player 11 can be used to play the video data selected with either the Story Board 13 or Strip Viewer 15. The Player 11 can also be used to define a segment to be edited by setting a start point and an end point while the Player is displaying video.

Figure 3:
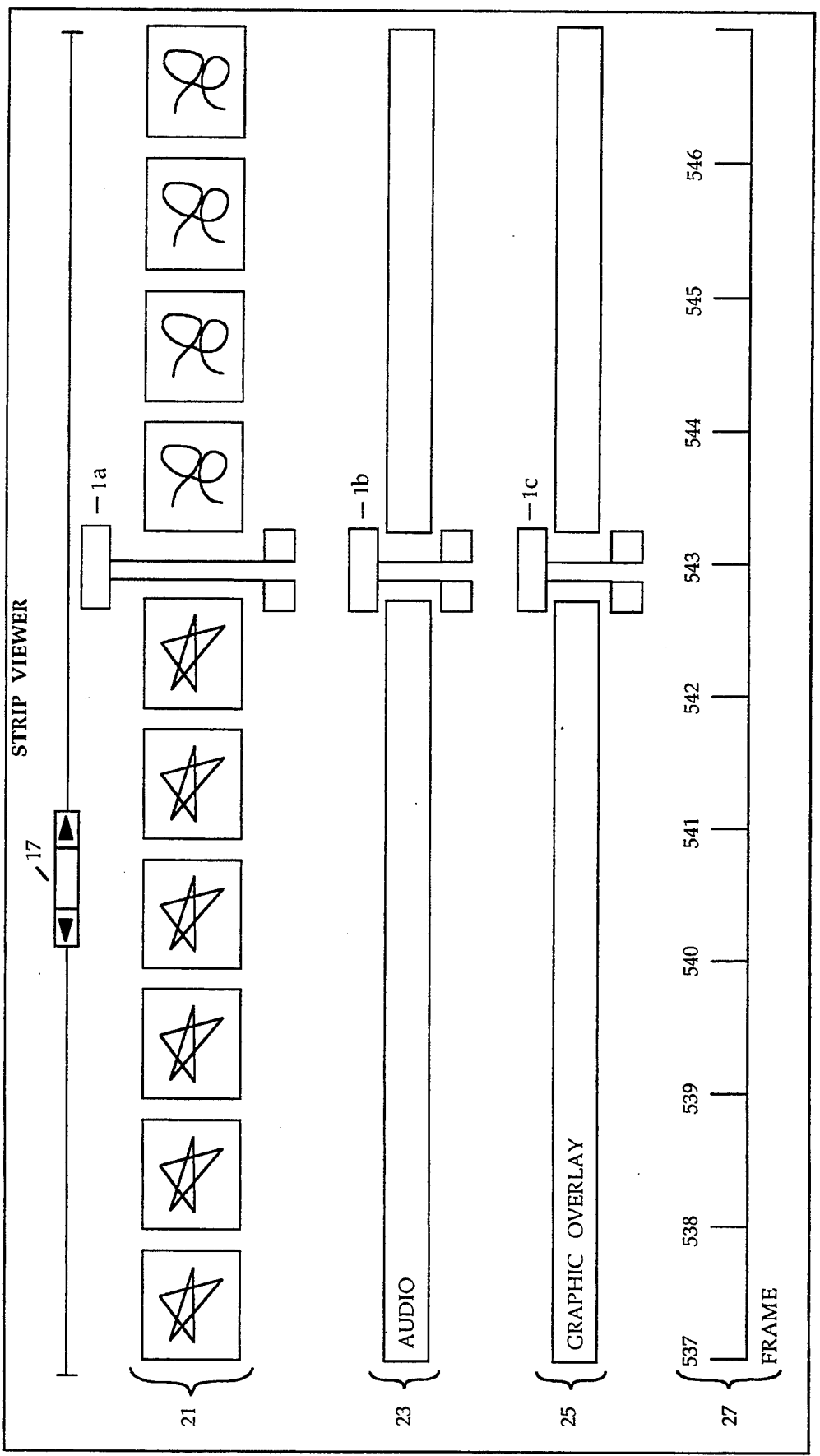
FIG. 3 is an embodiment of a Strip Viewer Display.

The Strip Viewer 15 is not limited to displaying and editing video information. The Strip Viewer 15 interface is general enough to present any number of media tracks of different types. In FIG. 3, another embodiment of a Strip Viewer is shown in which three different tracks of media information are displayed: video 21, audio 23, and graphic overlay 25. Each of the three media tracks can be edited individually or as a group. Other possible media tracks include (but are not limited to) annotation tracks, video special effects tracks, 35 mm slide tracks, and hydraulic actuator tracks (to emulate motion). The media information that is visually displayed on the screen is actually stored in an associated database. The data base used to store the information will be explained in more detail below.

Located below the three tracks of media information in the Strip Viewer of FIG. 3, is a scale 27 which displays frame numbers or time units. An icon referred to as a "Splinder" (1a, 1b, and c) is located on each of the three media tracks (21, 23, and 25) between frame 542 and frame 543. This location represents the border between two different shots as can be seen from the contents of the video frames in media track 21. The Splinder (1a, 1b, and 1c) is used to split the multimedia information into two different shots and can extend the media information into one shot or the other. The term "Splinder" originated by combining the terms SPLItter and ExteNDER together.

Figure 4:
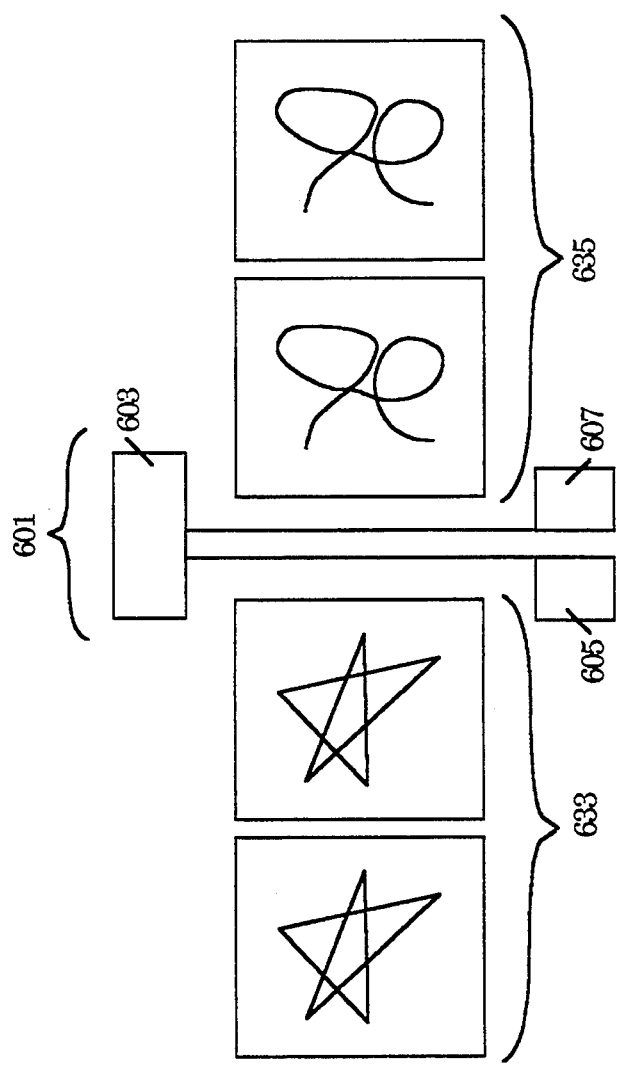
FIG. 4 is a detailed view of a "Splinder" between video frames from two different shots.

A detailed view of a Splinder 601 is displayed in FIG. 4. The Splinder 601 is displayed between the video frames from two different shots. The end frames of a first shot to the left of the Splinder 601 are represented by frames 633 and will hereafter be referred to as the "first shot". The first few frames of a second shot to the right of the Splinder 601 are represented by frames 635 and will hereafter be referred to as the "second shot". The icon representing the Splinder is constructed of a head 603, a left leg, a left foot 605, a right leg, and a right foot 607. The head 603, left foot 605, and right foot 607 parts of the Splinder are "hot spots" which can be grabbed and dragged with a cursor control device such as a mouse. For example, a user can "grab" the Splinder by moving the mouse until the cursor is on top of the Splinder and then depress a switch to signal the grab. The Splinder can then be dragged by moving the mouse while the switch is depressed. When the switch is released, the editor is notified that an edit has been made and the views are updated to reflect the edit. Preferably, the strip viewer refocuses the view at the location where the last edit was made. When the head 603 of the Splinder is grabbed and dragged, the entire Splinder 601 moves and the shots on both sides of the Splinder (633 and 635) are edited. However, if either the left foot 605 or right foot 607 is grabbed and dragged, only that foot and corresponding leg moves and only the shot on the corresponding side is edited.

FIGS. 5(a)–5(c) demonstrate the use of a Splinder editing a video track in detail. In FIGS. 5(a)–5(c), the video frames to the left of the Splinder will be referred to as the "first shot" and the video frames to the right of the cursor will be referred to as the "second shot".

Referring to FIG. 5(a), a partial view of Strip Viewer is displayed. In FIG. 5(a), a user places a cursor 590 on top of the head 503 of the Splinder 512, and "grabs" the head 503 of the Splinder 512 using a cursor control device such as a mouse. The user then drags the entire Splinder 512 by its head 503 to the left as indicated by the arrow used to show cursor movement. By dragging the Splinder 512 by its head to the left, the user simultaneously trims the ending of the shot to the left of the Splinder 512 and extends the beginning of the shot to the right of the Splinder 512. In FIG. 5(a), the user has grabbed the Splinder head 503 with a cursor 590 and drags it to the left, trimming frames from the first shot and extending frames from the second shot. The term "trimming" refers to cutting off unwanted frames. The term "extending" refers to adding frames to a border of a shot. Once the user stops dragging the Splinder and drops it into place, the Strip Viewer stores the edit performed. In this illustration, once the user has completed the edit, the database is updated to reflect that frames have been added to one shot and an equal number of frames have been trimmed from the other shot.

FIG. 5(b) demonstrates how the Splinder can be used to trim frames only from the end of the first shot. In FIG. 5(b), a user grabs the left foot 505 of the Splinder with the cursor 590 and drags the left leg 504 and foot 505 to the left, as indicated by the arrow used to show cursor movement. As the left leg 504 and foot 505 of the Splinder is dragged to the left across the frames of the first shot, frames are visually trimmed off the end of the first shot. Once the user stops moving the left leg 504 and foot 505 of the Splinder and drops it into place, the Strip Viewer stores the edit. The multimedia database in the present example is then updated to reflect that a few frames have been trimmed of the end of the first shot. At the completion of the edit, the "hole" between the two shots is collapsed together, restoring the Splinder to its original shape.

FIG. 5(c) demonstrates how the Splinder can be used to add previously cut frames to the end of the first shot. In FIG. 5(c), a user has grabbed the left foot 505 of the Splinder with the cursor 590 and has moved it to the right, extending the end of the first shot. As the left leg 504 and foot 505 of the Splinder are moved to the right, previously "cut" frames from the end of the first shot are revealed and temporarily cover frames from the second shot. When the user stops moving the left leg 504 and foot 505 of the Splinder and drops it into place, the edit is stored and the database is updated to reflect that frames have been added to the end of the first shot. At the completion of the edit, the frames from the first shot are moved over to the left, revealing the temporarily covered frames of the second shot and restoring the Splinder to its original shape.

The operations affecting the end of the first shot demonstrated in FIGS. 5(b) and 5(c) can similarly be performed on the beginning of the second shot by using the right leg and foot instead. For example, if a user grabs the right foot of the Splinder and moves it to the right across the frames of the second shot, video frames will be trimmed off of the beginning of the second shot. Similarly, if the user grabs the right foot of the Splinder and moves it to the left across the frames of the first shot instead, previously cut frames will be added to the beginning of the second shot.

Figure 6:
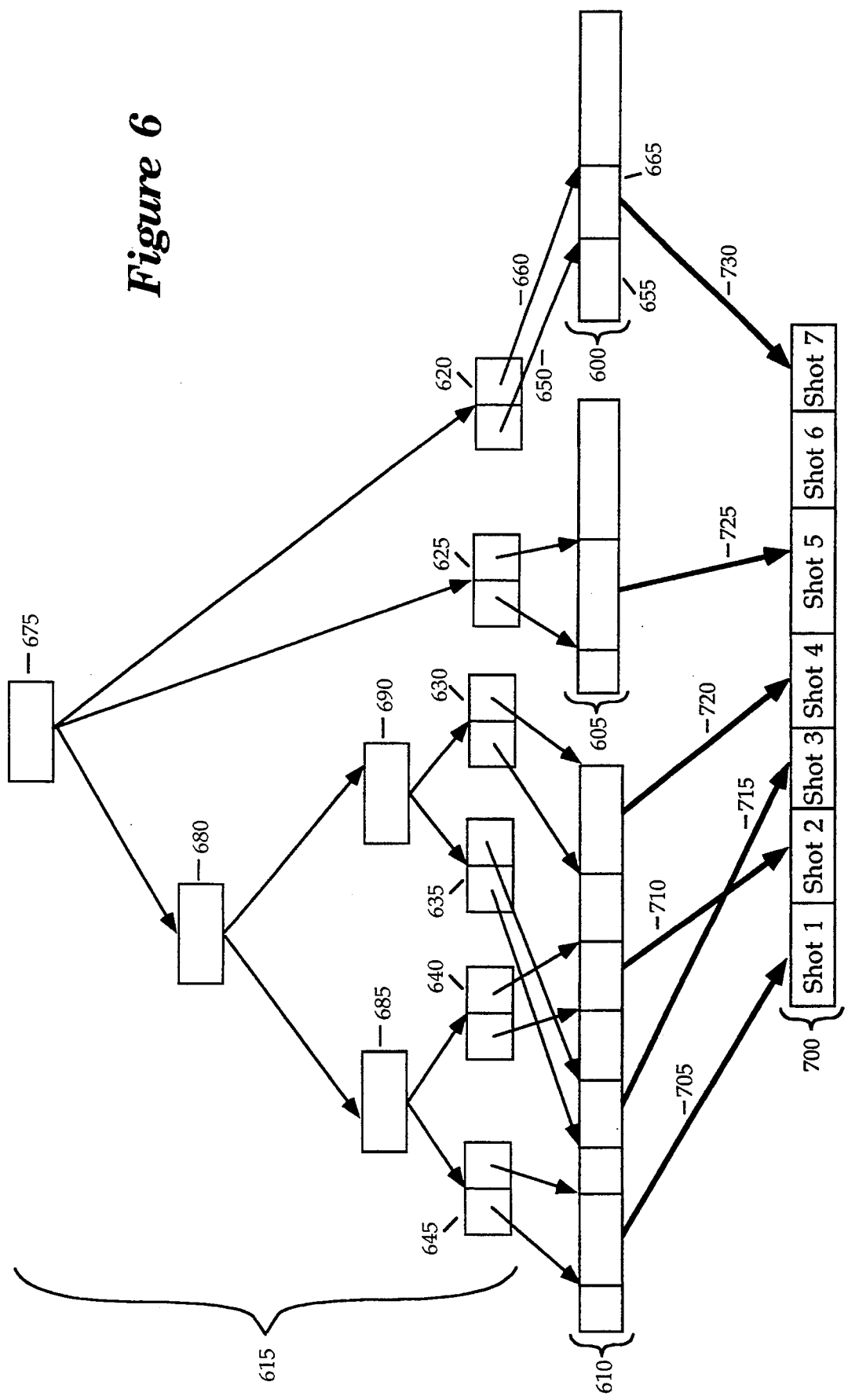
FIG. 6 gives a conceptual diagram of a video database and a data structure produced by the present invention.

When a user "edits" the multimedia information on the display screen using the Splinder of the present invention, the on screen "edits" are used to update an associated database storing the multimedia information. In FIG. 6, one possible embodiment of a digital video database is displayed. The on screen editing techniques described herein, however, are not limited to this particular implementation of a multimedia database and other database structures may be utilized.

Referring to FIG. 6, a diagram illustrating a possible implementation of a digital video database is displayed. In the center of the diagram is a series of three rectangles 600, 605, and 610 representing compressed digital video data files. Each video data file contains compressed digital data that define the frames of video. Displayed above the video data files is a tree data structure 615 representing an edited multimedia production. A tree structure is preferred since it closely approximates the hierarchy that video and film producers use to organize video and film projects as displayed in FIG. 2.

At the lowest level of the tree data structure 615 are the data structures 620, 625, 630, 635, 640, and 645 which define segments of consecutive video frames referred to as "shots". These shot data structures contain two pointers. The first pointer in each shot data structure points to the first frame of a shot in a video data file and the second pointer points to the last frame of the shot in the same video data file. For example, with respect to shot data structure 620, the first pointer 650 points to the first frame 655 of the shot contained in the video data file 600, and the second pointer 660 points to the last frame 665 of the shot. In the present embodiment, when an edit is made which extends or trims a shot, the pointer in the video data file, defining the beginning or end of the shot, is moved appropriately.

Above the shot data structures 620–645 are the higher level data structures which define the organization of an edited production. The production is built up of linked data structures forming a tree data structure. At the top of the tree is the production root 675 representing the entire production. The production is successively broken down into smaller subunits 680, 685, and 690, reaching the shot data structures 620–645, which form the base of the tree structure. Since no mandatory hierarchy is imposed by the present invention, the tree structure for each project will look different since it will reflect how a particular producer organizes the projects.

Below the compressed digital video files 600–610 is a "virtual film strip" 700 representing the current sequence of video data. As can be seen in the diagram, the shots are presented in consecutive order as defined by the production's tree data structure. Pointers 705, 710, 715, 720, 725, and 730 are provided from the video files 600, 605, and 610, to the virtual film strip 700, to provide the linkage of information.

The on-screen editing methods of the present invention, however, are not limited to the compressed video database presented. For example, the edits could instead modify a database of SMPTE time codes used to designate "in-" and "out-points" on actual video tapes or film stock.

The foregoing has described a method and apparatus for viewing and editing multimedia information. It is contemplated that changes and modifications may be made by one of ordinary skill in the art, to the materials and arrangements of elements of the present invention without departing from the spirit and scope of the invention.

We claim:

1. A method of displaying and editing multimedia information on a display screen, said method comprising the steps of:

displaying a first unit of multimedia information on said display screen, said first unit of multimedia information having a first start time and a first end time;

displaying a second unit of multimedia information on said display screen near to said first unit of multimedia information, said second unit of multimedia information having a second start time and a second end time;

displaying a splinder on said display screen, said splinder comprised of a first portion, a second portion movably coupled to said first portion, and a third portion movably coupled to said first portion, said splinder located between said first unit of multimedia information and said second unit of multimedia information, moving said first portion, said second portion and said third portion of the splinder across the first unit and second unit of multimedia information; and editing said first end time of said first unit of multimedia information and said second start time of said second unit of multimedia information according to the movement of the splinder on said display screen such that said multimedia information is edited on the display screen by movement of the splinder across said multimedia information.

2. The method as set forth in claim 1 wherein the step of editing said first unit and second unit of multimedia information on said display screen further comprises:

simultaneously extending the first end time of the first unit of multimedia information and trimming the second start time of the second unit of multimedia information if the first portion of the splinder is moved across the second unit of multimedia information; and simultaneously extending the second start time of the second unit of multimedia information and trimming the first end time of the first unit of multimedia information if the first portion of the splinder is moved across the first unit of multimedia information.

3. The method as set forth in claim 1 wherein the step of editing said first unit and second unit of multimedia information on said display screen further comprises:

extending the second unit of multimedia information if the third portion of the splinder is moved across the first unit of multimedia information; and trimming the second unit of multimedia information if the third portion of the splinder is moved across the second unit of multimedia information.

4. The method as set forth in claim 1 wherein the step of editing said first unit and second unit of multimedia information on said display screen further comprises:

extending the first end time of the first unit of multimedia information if the second portion of the splinder is moved across the second unit of multimedia information; and trimming the first end time of the first unit of multimedia information if the second portion of the splinder is moved across the first unit of multimedia information.

5. The method as set forth in claim 1 wherein said step of displaying a splinder on said display screen comprises the substeps of:

rendering said first portion of the splinder as a head, said head comprising a horizontally defined region on said display device;

rendering said second portion of the splinder as a left leg and a left foot, said left leg comprising a vertically defined region on said display device and having a first end movably attached to said head, said leg extending vertically downward from said head, and said left foot attached to the second end of said left leg defines a region which horizontally extends to the left of said left leg; and rendering said third portion of the splinder as a right leg and a right foot parallel to said left leg, said right leg comprising a vertically defined region on said display device and having a first end movably attached to said head and a second end attached to said right foot, said right foot defining a region which horizontally extends to the right of said right leg.

6. The method set forth in claim 1 wherein the splinder is moved according to the movement of a cursor as controlled by a cursor control device.

7. An apparatus for displaying and editing multimedia information, said apparatus comprising:

a digital computer;

a display device coupled to said digital computer, said display device having a cursor;

a cursor control device coupled to said digital computer, said cursor control device controlling the location of said cursor on said display device;

a first unit of multimedia information displayed on said display device, said first unit of multimedia information having a first start time and a first end time;

a second unit of multimedia information displayed on said display device near to said first unit of multimedia information, said second unit of multimedia information having a second start time and a second end time; and a splinder displayed on said display device between said first unit of multimedia information and said second unit of multimedia information, said splinder comprising a first portion, a second portion movably coupled to said first portion, and a third portion movably coupled to said first portion, said first portion, said second portion and said third portion of the splinder movable by the cursor displayed on said display screen and the cursor control device coupled to said display screen; and editing means for editing said first end time of said first unit of multimedia information and said second start time of said second unit of multimedia information, said editing means responsive to movements of said splinder by said cursor control device across the first unit of multimedia information and second unit of multimedia information displayed on said display device.

8. The apparatus as set forth in claim 7 wherein:

if said first portion of the splinder is moved across said second unit of multimedia information said editing means simultaneously extends first end time of the said first unit of multimedia information and trims said second start time of the second unit of multimedia information; and if said first portion of the splinder is moved across said first unit of multimedia information said editing means simultaneously extends the second start time of the second unit of multimedia information and trims first end time of the said first unit of multimedia information.

9. The apparatus as set forth in claim 7 wherein:

if said second portion of the splinder is moved across said first unit of multimedia information said editing means trims said first unit of multimedia information; and if said second portion of the splinder is moved across said second unit of multimedia information said editing means extends said first unit of multimedia information.

10. The apparatus set forth in claim 7 wherein:

if said third portion of the splinder is moved across said first unit of multimedia information said editing means extends said second unit of multimedia information; and if said third portion of the splinder is moved across said second unit of multimedia information said editing means trims said second unit of multimedia information.

11. The apparatus as set forth in claim 7 wherein:

said first portion of the splinder displayed comprises a head, said head comprising a horizontally defined region on said display device;

said second portion of the splinder comprises a left leg and a left foot, said left leg comprising a vertically defined region on said display device and having a first end movably attached to said head, said leg extending vertically downward from said head, and said left foot attached to the second end of said left leg defines a region which horizontally extends to the left of said left leg; and said third portion of the splinder comprises a right leg and a right foot symmetric to said left leg and said left foot, said right leg comprising a vertically defined region on said display device and having a first end movably attached to said head and a second end attached to said right foot, said right foot defining a region which horizontally extends to the right of said right leg.

12. The apparatus set forth in claim 7 wherein said editing means further comprises:

a memory for storing multimedia information, said memory coupled to said digital computer;

a first set of pointers into said memory, said first set of pointers associated with said first unit of multimedia information, said first set of pointers comprising a first entry pointer and a first exit pointer, said first entry pointer defining the beginning of the first unit of multimedia information, said first exit pointer defining the end of the first unit of multimedia information; and a second set of pointers into said memory, said second set of pointers associated with said second unit of multimedia information, said first set of pointers comprising a second entry pointer and a second exit pointer, said second entry pointer defining the beginning of the second unit of multimedia information, said second exit pointer defining the end of the second unit of multimedia information; said editing means updating the pointers in the memory according to the movement of the splinder.

13. The apparatus set forth in claim 12 wherein:

if said first portion is moved across said second unit of multimedia information said editing means extends first end time of the said first unit of multimedia information by increasing said first exit pointer and simultaneously trims said second start time of the second unit of multimedia information by increasing said second entry pointer; and if said first portion is moved across said first unit of multimedia information said editing means extends said second start time of the second unit of multimedia information by decreasing said second entry pointer and simultaneously trims said first end time of the first unit of multimedia information by decreasing said first exit pointer.

14. The apparatus set forth in claim 12 wherein:

if said second portion is moved across said first unit of multimedia information said editing means trims said first unit of multimedia information by decreasing said first exit pointer; and if said second portion is moved across said second unit of multimedia information said editing means extends said first unit of multimedia information by increasing said first exit pointer.

15. The apparatus set forth in claim 12 wherein:

if said third portion is moved across said first unit of multimedia information said editing means extends said second unit of multimedia information by decreasing said second entry pointer; and if said third portion is moved across said second unit of multimedia information said editing means trims said second unit of multimedia information by increasing said second entry pointer.

16. An apparatus for displaying and editing multimedia information, said apparatus comprising:

a digital computer;

a display device coupled to said digital computer, said display device having a cursor;

a cursor control device coupled to said digital computer, said cursor control device controlling the location of said cursor on said display device; and a display on said display device, said display comprising the elements of:

at least one track of multimedia information, each track representative of multimedia information displayed on a time-line basis;

at least one splinder, each splinder associated with a multimedia information track, said splinder splitting said multimedia track into a first unit of multimedia information and a second unit of multimedia information, said splinder moveable across the two multimedia information units by the cursor and the cursor control device; and a scale, said scale displaying a time reference for each multimedia information track; and editing means for performing edits of the multimedia information track, said editing means performing time based edits according to the movement of the splinder across said multimedia information units.

17. The apparatus set forth in claim 16 wherein said display further comprises a Story Board representation of said multimedia information.

18. The apparatus set forth in claim 17 wherein said display further comprises a Player for viewing said multimedia information.

19. The apparatus set forth in claim 17 wherein each splinder further comprises:

a first portion, said first portion movable by said cursor and cursor control device such that if said first portion is moved across said second unit of multimedia information said first unit of multimedia information is extended and said second unit of multimedia information is trimmed and if said first portion of the splinder is moved across said first unit of multimedia information said second unit of multimedia information is extended and said first unit of multimedia information is trimmed;

a second portion coupled to said first portion, said second portion movable by said cursor and cursor control device such that if said second portion is moved across said first unit of multimedia information said first unit of multimedia information is trimmed and if said second portion is moved across said second unit of multimedia information said first unit of multimedia information is extended; and a third portion coupled to said first portion, said third portion movable by said cursor and cursor control device such that if said third portion is moved across said first unit of multimedia information said second unit of multimedia information is extended and if said third portion is moved across said second unit of multimedia information said second unit of multimedia information is trimmed.

* * * * *